United States Patent [19]
Durham

[11] 3,957,166
[45] May 18, 1976

[54] ADAPTER APPARATUS FOR CONTAINER TRANSPORTING VEHICLES

[76] Inventor: R. Richard Durham, 618 E. Dominion Blvd., Columbus, Ohio 43214

[22] Filed: Apr. 14, 1975

[21] Appl. No.: 567,756

[52] U.S. Cl. .............................. 214/505; 214/508; 214/516; 214/517
[51] Int. Cl.² .......................................... B60P 1/64
[58] Field of Search ........... 214/505, 506, 508, 515, 214/516, 517, 620, 621

[56] References Cited
UNITED STATES PATENTS

| | | | |
|---|---|---|---|
| 3,214,046 | 10/1965 | Dempster et al. | 214/516 X |
| 3,664,533 | 5/1972 | Hand | 214/516 |

Primary Examiner—Robert G. Sheridan
Attorney, Agent, or Firm—Cennamo; Kremblas; Foster

[57] ABSTRACT

The present invention relates to container handling adapter apparatus which is characterized by a construction wherein a well-known type of transporting equipment which is limited to handling a specific type container can be quickly and simply converted to handle other container constructions. The adapter apparatus of the present invention includes a modified understructure which is adapted to be picked up by transport systems, such as manufactured by Dempster Brothers, Inc. The understructure includes a base which is provided with side rails, a power winch and hydraulic couplings to accomodate the loading and unloading of containers manufactured by several of the leading manufacturers which cannot be handled by apparatus such as the Dempster Brothers, Inc. system. Locking or stabilizing mechanisms are provided for safe transportation of the container mounted thereon.

5 Claims, 9 Drawing Figures

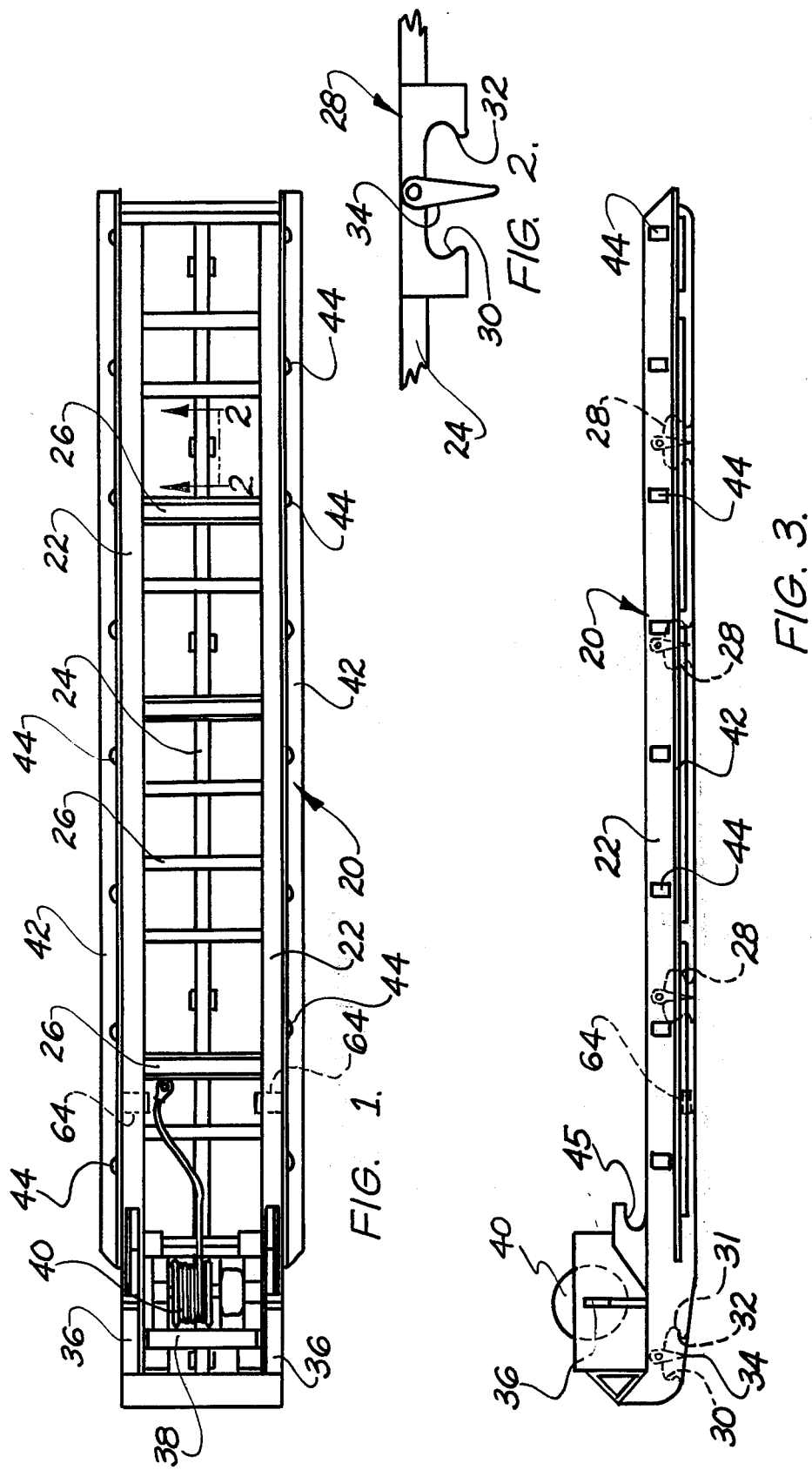

ADAPTER APPARATUS FOR CONTAINER TRANSPORTING VEHICLES

BACKGROUND

A problem which has long prevailed in the refuse collection industry is the fact that some major manufacturers' transportation equipment is designed to handle only containers which are cooperatively designed to be picked up only by a truck and chassis utilizing a specific structure. The best example occurs relative to the well-known Dempster Brothers, Inc. system. Certain Dempster manufactured vehicle bodies are constructed to pick up only specifically designed Dempster manufactured containers.

Other major manufacturers in this industry have vehicle bodies and loading equipment which handle the most common design of containers but which are not equipped to pick-up the specially constructed Dempster containers.

To the owners of Dempster vehicle chassis, this represents a serious disadvantage in many market place circumstances by limiting their capability to service customers who have containers specifically designed to be picked up by Dempster type loading equipment.

The present invention provides a relatively inexpensive solution which provides very simple and expedient conversion of a Dempster type vehicle body to enable the user to service those containers which otherwise he would be unable to handle and thereby lose potential business.

SUMMARY

The present invention relates in general to refuse collection apparatus and particularly to a removably mounted adapter or conversion unit which is designed to be mounted on a truck body. The adapter includes a base means which incorporates a particular known understructure provided with opposed hooks spaced at intervals which can be successfully engaged by a bail such as those incorporated on certain models of vehicle bodies manufactured by Dempster Brothers, Inc.

The unique adapter unit also includes means for accepting container configurations common to most manufacturers which cannot, however, be accomodated by many standard Dempster Brothers type vehicle bodies referred to as the Dempster Dinosaur System.

The adapter unit further includes a power winch and drive means in conjunction with expedient connections adapted to utilize the receiving vehicle's hydraulic system and independent controls for the adapter's power system.

Locking means are provided to insure secure and stable transportation of containers on the adapter unit mounted on the vehicle.

OBJECTS

It is a primary object to provide an adapter unit which provides versatility to an otherwise limited container collection and transporting vehicle in an inexpensive manner.

It is another object of the present invention to provide an adapter unit which incorporates features which permits it to be mounted on appropriate vehicle bodies in an efficient and expiditious manner to expand the container handling capability of the vehicle.

It is another object of the present invention to provide an adapter unit of the type described which may be removed after performing its intended function with no substantial delay in the conversion process to permit the vehicle to be used in its original form.

Further objects and advantages of the present invention will be apparent from the following description, reference being had to the accompanying drawings wherein preferred forms of embodiments of the invention are clearly shown.

IN THE DRAWINGS

FIG. 1 is a top plan view of an adapter apparatus constructed in accordance with the present invention;

FIG. 2 is a partial side elevational view of a portion of the apparatus shown in FIG. 1 illustrating the double hook and shuttle member comprising a portion of the understructure;

FIG. 3 is a side elevational view of the apparatus shown in FIG. 1;

Figure 7:
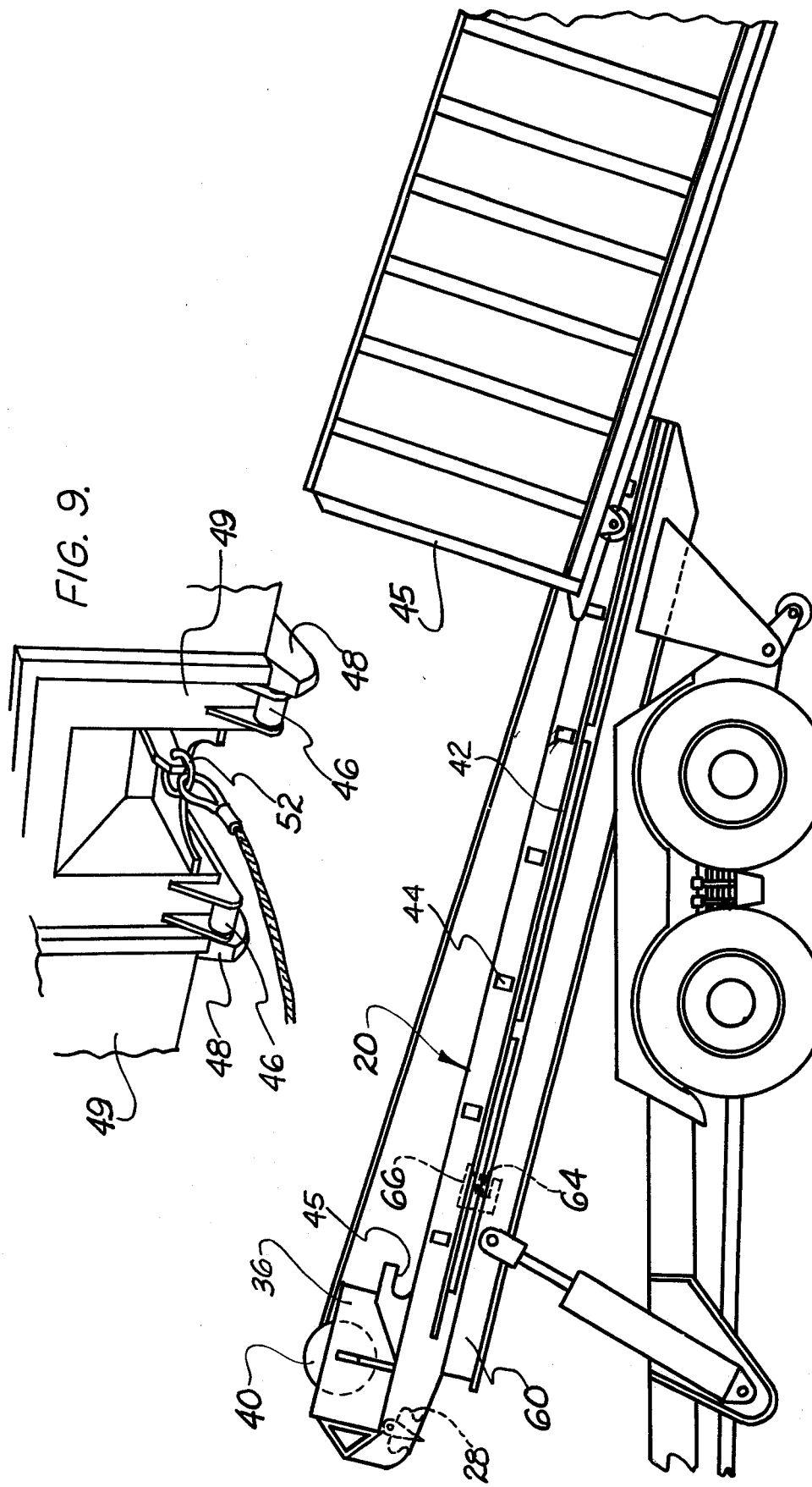
Figure 8:
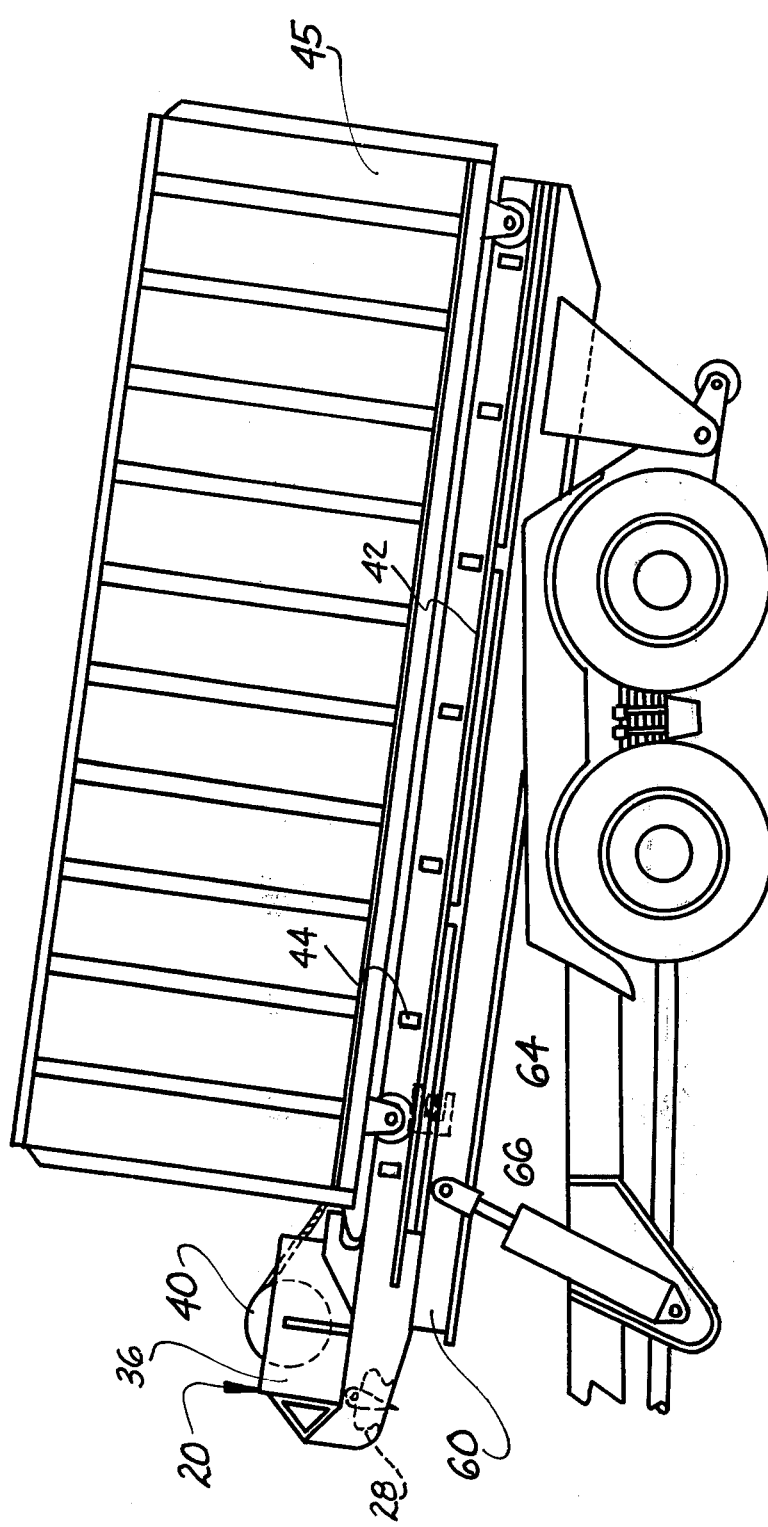

FIG. 7 is a side elevational view of the apparatus shown in FIG. 1 illustrated fully mounted on the vehicle chassis and showing one of the initial positions of loading a container onto the vehicle using the adapter apparatus of the present invention; and FIG. 8 is a view similar to the view shown in FIG. 7 illustrating the container mounting procedure in the last stages with the container fully mounted on the adapter and the tilting frame of the vehicle almost being lowered to a position parallel to the ground.

DETAILED DESCRIPTION

An adapter unit constructed in accordance with the present invention is illustrated in FIG. 1 and includes a base or frame means, indicated generally at 20.

Frame means 20 comprises longitudinally extending side frame members 22, a centrally disposed support member 24, and a plurality of laterally disposed rib members such as at 26. Each of said members may be conventionally joined, by welding, for example, to provide a unitary structure having adequate strength for the necessary application of the present invention.

Support member 24, which extend the entire length of the frame means, includes a plurality of hook stations, indicated generally at 28, such as shown individually in FIG. 2. Each hook station 28 includes a pair of opposing hook members 30, 32 and a pivotally mounted shuttle members 34.

The opposing hook members and shuttle members are adapted to cooperate with a spring biased connecting device such as a bail of the type provided on certain vehicle bodies manufactured by Dempster Brothers, Inc.

The shuttle member 34 is designed to selectively close one of the hook members 32 relative to engagement of the vehicle bail member dependent upon the original direction of travel of the bail member relative to the hook stations.

A similar hook and bail arrangement is disclosed in U.S. Pat. No. 3,144,149 which fully describes a Dempster type vehicle referred to herein and a similar hook and bail arrangement which heretofore has been incorporated only for loading and unloading specific type refuse container structures.

This very container structure and the corresponding vehicle bail system is the root of the problem to owners of such vehicles in that the vehicles are specifically limited to picking up and transporting only one specific type container which incorporates the specific understructure adapted to receive the bail on the vehicle body.

An owner of such a vehicle, which is quite expensive, is therefore put in an impossible competitive position relative to jobs which require hauling of other standard types of containers which are described in detail later herein. Heretofore, an owner in order to accomodate accounts using these other types of containers, must either purchase another type of vehicle or simply not bid the job.

The hook stations 28 described herein, including the forwardmost station 31 permit the adapter unit to be simply and conveniently engaged and moved onto the vehicle bed in a similar manner or procedure as picking up and loading the specific type of container described above. This procedure is well known to owners of vehicle bodies provided with hydraulic bail systems such as described fully in the U.S. patent noted above.

The forward end of adapter frame means 20 includes an upraised portion comprising side panels 36 and lateral members 38. A hydraulic winch and cable assembly 40 is conventionally mounted to side panels 36 and may be conveniently driven by a conventional hydraulic motor, not shown which is preferably mounted to side panels 36 adjacent to assembly 40 and suitable connected thereto.

Each side frame member 22 is provided with container-receiving guide means 42 in the form of a L-shaped plate welded to member 22 and extending from adjacent the forward upraised portion the entire length of side member 22 to the rear end of the frame 20.

Guide means 42 include a series of projections 44 to aid in centering the roller skids of conventional containers on the upper surface of side members 22.

A partial front perspective view of such a container 45 is shown in FIG. 9 wherein the roller skids 46 include outwardly facing guide rails 48. The roller skids 46 are adapted to engage the upper surface of said members 22 with the guide rails 48 being laterally positioned by projections 44 and supported by the flange portion 43 of guide means 42. In this manner accurate positioning of the container is achieved and stability against side to side movement is accomplished.

As seen in FIG. 9, container 45 is provided with a ring 52 which the cable of winch and cable assembly 40 may be removably connected.

As best seen in FIG. 1, a safety locking means 45 is provided which is adapted to receive roller skids 46 of the container 45 when the container is pulled fully onto the adapter frame 20.

Locking means 54 functions to prevent forward movement of container 45 and also limits upward movement of the front end of the container to provide stability.

A vehicle of the type described earlier herein is shown in FIG. 4 and includes a tilting frame 60 and a movable connecting device or bail 62. The body 60 and bail 62 may be of conventional construction such as disclosed for this type of system in U.S. Pat. No. 3,106,020. However, other modifications and improvements which accomplish the same results would also serve usefully in connection with the present invention.

Since the above-mentioned construction is well-known, the details of structure are not shown or described herein except for those portions which aid in explaining the operation and use of the present invention.

Bail 62 or other appropriate form of connecting device is preferably mounted on a hydraulically operated carriage means, not shown, which can be controlled from the vehicle cab by the operator.

To pick up the adapter unit of the present invention, the vehicle is backed up to the frame means 20 with the frame usually sitting on the ground or some other supporting surface. When the vehicle is sufficiently close to the forward end of frame 30, the tilting frame is conventionally in close proximity to the forward hook station 31.

The operator then energizes the carriage carrying bail 62 to move bail 62 to its rearwardmost position with the bail 62 being projected below the front portion of frame means 20. Bail 62 is preferably spring-biased in a raised position with respect to the carriage, not shown, and with the vehicle and container properly aligned, it will engage forward hook 30 of hook station 31 upon slightly raising tilting frame 60.

Figure 4:
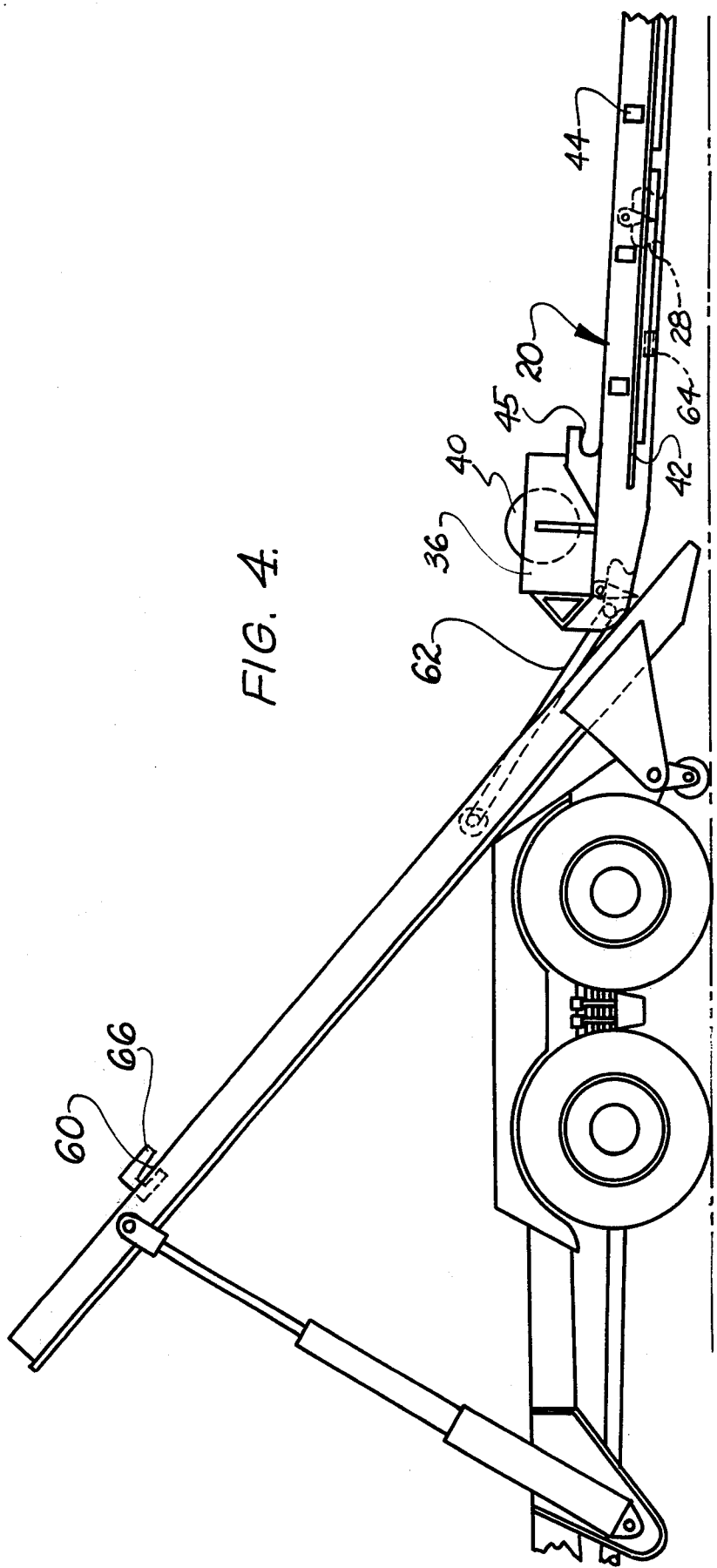
FIG. 4 is a side elevational view of a portion of the apparatus shown in FIG. 1 illustrating the mode of operation of the apparatus in conjunction with a vehicle chassis which is to be adapted in a manner using the present invention.

Upon making this initial engagement, the operator merely actuates the carriage to pull bail 62 toward the forward portion of frame 60 to pull the front portion of adapter frame 20 onto tilting frame 60 as seen in FIG. 4.

Figure 5:
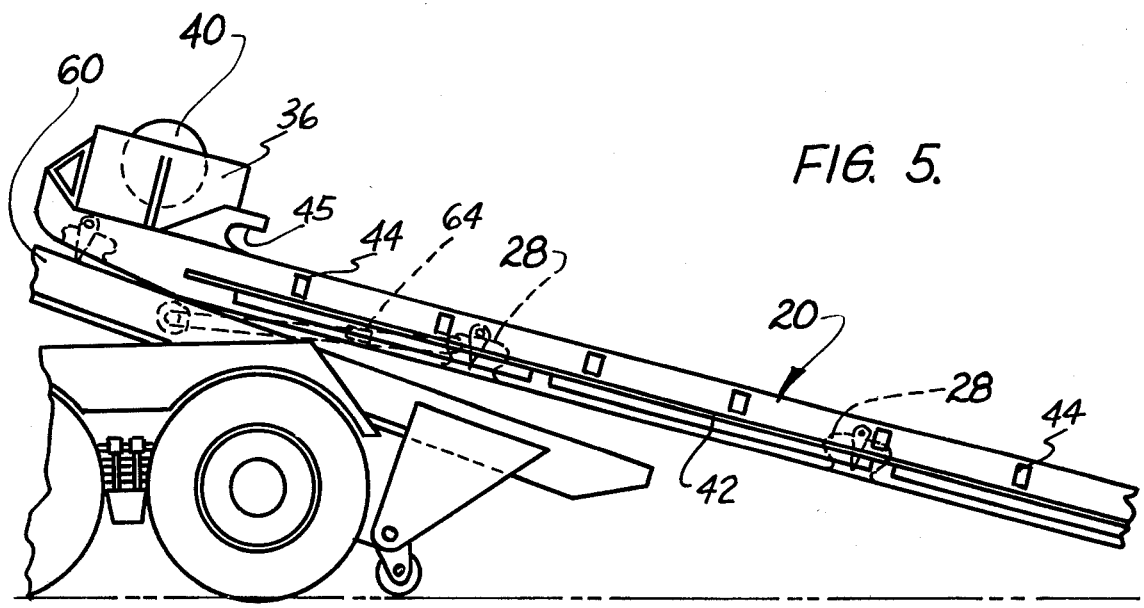
FIG. 5 is a view similar to the view shown in FIG. 4 illustrating a subsequent position in the sequence of mounting the adapter on a vehicle chassis.

After the first stroke of the carriage and bail 62, the motion thereof is reversed by the operator in the same manner as the first positioning thereof to engage the next adjacent hook station 28 in the same manner as hook station 31 as best seen in FIG. 5.

Figure 6:
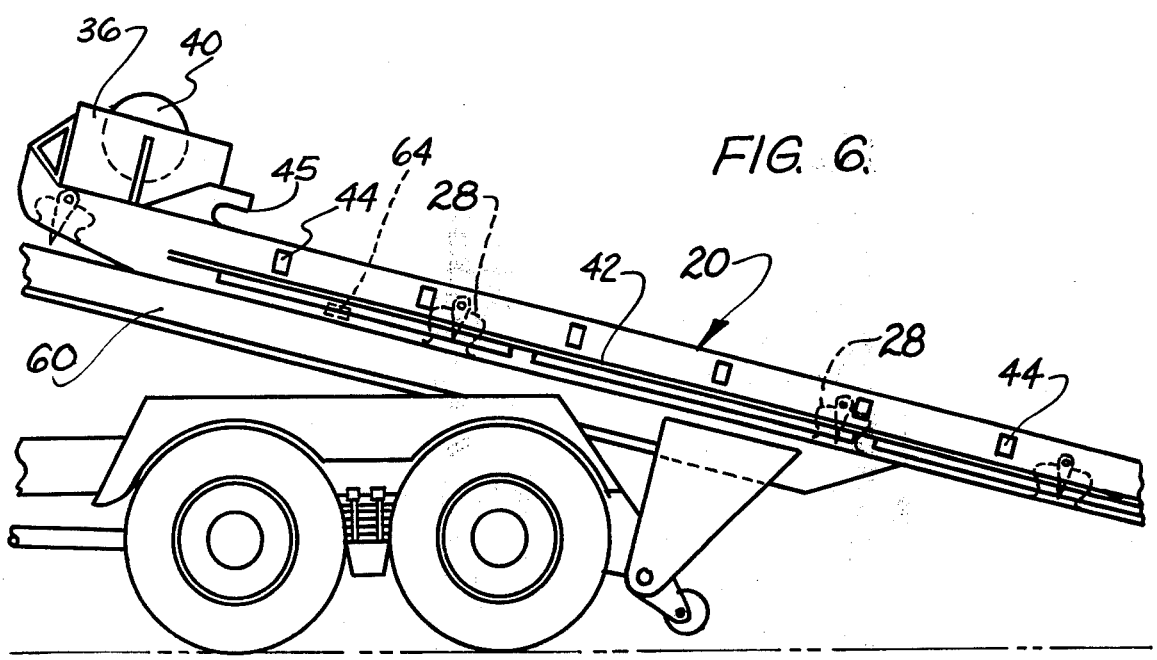
FIG. 6 is a view similar to the view shown in FIG. 5 showing a subsequent position relative to the view shown in FIG. 5.

The weight of the front end portion of the adapter unit coupled with the rear end portion still resting on the ground, will ordinarily be sufficient to hold the adapter frame 20 in place on the tilting frame by frictional forces and gravity. However, operators of this type of vehicle system, quickly learn in picking up and unloading containers having similar understructures, to adjust the angle of the tilting frame 60 parallel to the adapter unit 20 during this procedure to assure proper loading and unloading as shown in FIG. 6.

Quite simply, the operator energizes the bail 62 as described herein to continue pulling up the adapter frame 20 until the adapter 20 is pulled forward into its carrying position as shown in FIGS. 7 and 8.

The forward movement of the adapter frame 20 is arrested by means of stop plates 64 fixed to the underneath of frame 20 which are adapted to engage locking or stop means 66 fixed in the desired position on the bed of tilting frame 60. The forward and upward movement of the adapter frame is therefore secured in this manner and the rearward travel of the frame 20 is prevented by bail 62 which is left in engagement with hook 30 of the rearwardmost hook station 28.

With the adapter frame securely mounted in this manner on the frame 60, which normally takes only five to ten minutes, the vehicle is quickly converted to be used to pick up and transport the other forms of containers, such as container 45, which would otherwise be impossible to handle with its original pick-up and unloading system.

Upon the completion of the loading step of the adapter in position on frame 60, the final step is to provide connection of the adapter hydraulic motor to the hydraulic system of the vehicle frame 20. It should be noted that while an independent power system could be employed without departing from the spirit of the present invention, it is most convenient as well as economical to employ the existing hydraulic power already present on the vehicle frame 60.

This may be readily accomplished with only a slight modification of the hydraulic lines conventionally present in the type of transport vehicle referred to herein. The mere addition of a T-hose connection provided with a conventional "quick change" coupling permits the operator to connect suitable hydraulic lines from the hydraulic motor and winch assembly directly to the hydraulic power system of the vehicle with little if any inconvenience.

Upon accomplishing this final step, the operator is then ready to pick-up and deliver those containers such as container 45 in the well-known standard manner. Briefly, this procedure merely includes positioning of the vehicle close to the container, manually attaching the cable to the container, and finally energizing the winch to draw the container onto the adapter frame 20. The unloading of the container is again conventional and well-known.

After the adapter unit 20 has served its purpose and the operator wishes to return the transport vehicle to its original configuration, the procedure for unloading the adapter unit is generally the reverse of the loading step described herein.

It should be readily apparent that the shuttle 34 functions to atuomatically position the bail 62 in the appropriate hook 30 or 32 depending upon the direction of movement of the bail 62 from its original engagement position in the forward hook 30.

To discharge the adapter frame 20, the operator quickly learns how to manipulate the bail 62 so as to cause it to enter the proper hook at its successive station.

It should be readily appreciated from the foregoing description that the adapter unit of the present invention is surprisingly advantageous particularly when viewed in light of its simplicity of construction, its relatively economical cost and its convenience in loading and unloading.

It offers much more variety to the owner of a carriage-bail type vehicle than either form of vehicle presently offered by manufacturers.

Further, for an owner of multiple vehicles of the carriage-bail type, a single adapter, removably detachable in the manner herein described, provides a relatively inexpensive capital cost and greater versatility than a unit which might be provided with a permanent dual system capable of handling both types of the containers described herein.

The convenient and fast conversion possible with the present invention permits an operator to employ the adapter, with any one of a plurality of his vehicles, whereas a permanent dual system is limited to only that one vehicle. Should that one vehicle become unavailable through breakdown, routine maintenance or the like, the capacity to pick-up and deliver conventional containers such as container 45 shown herein is seriously impaired.

However, employing the adapter of the present invention, the operator has a choice of which vehicle he wishes to convert to the alternate loading and unloading system described herein. If one vehicle is in need of maintenance or repair, for example, the operator merely loads the adapter frame 20 onto another appropriate vehicle.

The adapter unit employed as herein described truly offers the owner the "best of both worlds" for a relatively small investment and no significant inconvenience is encountered in mounting or discharging the adapter unit.

What is claimed is:

1. An adapter apparatus for container transporting vehicles comprising, in combination, a base means including a longitudinally extending rail provided with a plurality of spaced hook stations, each of said hook stations including a pair of opposing hook members and a pivotally mounted shuttle member adapter to selectively close a respective hook member relative to receiving a connecting device while permitting the connecting device to engage the other hook staton for causing selected movement of the base means in a given direction, said base means including guide means adapted to receive a container provided with cooperating guide members for accurate positioning of said container on said base means and a winch means mounted on said base means including a cable adapted for releasable engagement with a container to pull said container onto said base means.

2. The apparatus defined in claim 1 wherein said guide means on said base means include a longitudinally extending flange adapted to cooperatively receive a skid member on a container to provide support and stability to said container when engaging said guide means.

3. The apparatus defined in claim 1 wherein the forward portion of said base means includes a winch support assembly, said winch means being mounted on said support assembly in a raised position relative to the plane defined by said guide means on said base means.

4. A removably mounted adapter apparatus for container transporting vehicles of the type provided with a tilting frame having a longitudinally reciprocating carriage provided with a connecting means, said apparatus comprising in combination a base means provided with a plurality of spaced hook stations, each of said hook stations including a pair of opposing hook members having an opening facing each other to receive a connecting device in either of said hook members; a shuttle member pivotally mounted between each of said hook members and adapted to selectively close a respective hook members relative to said connecting device while permitting the connecting device to engage the other hook member for causing selected movement of said base means upon movement of said carriage in a given direction; said base means including a pair of longitudinally extending track means adapted to receive a container, said track means provided with guide means adapted to cooperatively receive guide members on said container; and a winch means mounted on said base means and including a cable adapted for releasable engagement to said container to pull said container onto said track means into a carrying position on said base means.

5. An improved adapter apparatus for removable mounting on a container transporting vehicle of the type provided with a tilting frame having a longitudinally reciprocating carriage provided with a releasable connecting means which functions to load or unload said adapter apparatus; the improvement comprising, a base means including a plurality of hook stations longitudinally spaced along the bottom of said base means and including opposing hook means adapted for selectively receiving said connecting device on said carriage means dependent upon the initial direction of movement of said connecting device upon initial engagement with said hook means; and longitudinally extending track means disposed on said base means adapted to receive a container onto said base means; and winch and cable means mounted on said base means for removable connection to said container to pull said container onto said track means.

* * * * *